Nov. 5, 1946.  R. H. STEVENS  2,410,555

OSCILLATING ROTARY SHEAR

Filed June 22, 1945  6 Sheets-Sheet 1

Inventor
Richard H. Stevens.
By R. S. A. Dougherty.
Attorney

Nov. 5, 1946.  R. H. STEVENS  2,410,555
OSCILLATING ROTARY SHEAR
Filed June 22, 1945  6 Sheets-Sheet 3

Inventor
Richard H. Stevens.
By R. S. C. Dougherty
Attorney

Nov. 5, 1946.  R. H. STEVENS  2,410,555
OSCILLATING ROTARY SHEAR
Filed June 22, 1945  6 Sheets-Sheet 6

Inventor
Richard H. Stevens.
By R. S. C. Dougherty
Attorney

Patented Nov. 5, 1946

2,410,555

UNITED STATES PATENT OFFICE 2,410,555

OSCILLATING ROTARY SHEAR

Richard H. Stevens, Baltimore, Md., assignor to Bethlehem Steel Company, a corporation of Pennsylvania Application June 22, 1945, Serial No. 601,012

24 Claims. (Cl. 164—68)

This invention pertains to metal shearing apparatus, and more particularly to a rotary shear for cutting metal sheets, strips, bars and the like into sections of predetermined length while the stock is in motion.

On the present rotary shears there is only one length of cut at which the peripheral speed of the knives corresponds to the speed of the strip. This speed is usually for the maximum length of cut. On all shorter cuts the shear is speeded up, and consequently at the time of cut there is a jerk on the strip or like material. For instance, if the strip is traveling 1600 feet per minute and the drum carrying the bottom knife is 42 inches in diameter and substantially 11 feet in circumference, at synchronous speed the drum carrying the shear blade would be making approximately $1600 \div 11 = 145.5$ R. P. M., and make 48.5 33-foot cuts per minute. Now if the cut is 16.5 feet, the number of cuts per minute $= 1600 \div 16.5 = 97$ cuts per minute which corresponds to $97 \times 3 = 291$ R. P. M. of drum or twice as fast as for a 33-foot cut.

While there is an overrunning clutch between the Waterbury drive and the shear, the inertia of the shear at this high speed is enough to stretch the hot strip during the time of cutting and reducing the gage in the rolls which makes a very definitive mark on each plate sheared.

If, however, the whole shear is advanced or retarded at the differential speed between the speed of the strip and the peripheral speed of the drum, the cutting will always be done at a synchronous speed thus eliminating the jerk while cutting.

One of the objects of my invention is to provide a rotary shear with means for varying the speed of the shears with respect to the speed of the stock so that variations may be made in both the lengths of the cuts and the speed of operation of the machine.

Another object of my invention is to provide a rotating shear in which the cutting blades, in addition to being rotated transversely of the stock for effecting the cuts, are also positively oscillated in the direction of the line of travel of the stock, to cause the cutting blades to move with the stock when the cut is made, and in which the mechanism employed for producing such oscillations is designed to be adjusted in such a way that the linear speed of the blades may be synchronized with that of the stock at the instant of cutting.

It is also an object of the invention to provide a rotary shear in which manually as well as automatically controlled means are provided whereby to increase the variations in lengths of cuts permissible in the machine as well as increase the variations in the limits of its operation.

These and various other objects, as well as the various other novel features and advantages of the invention, will be apparent when the following detailed description is read in conjunction with the accompanying six sheets of drawings in which like characters of reference indicate like parts.

Referring now to the various characters of reference on the drawings and first to Figs. 1 to 4, the numeral 1 indicates the base for the shear frame having a slideway 2 adapted to receive and support the oscillating shear frame 3 in which the top and bottom rotary shear drums 4 and 5 respectively are mounted and geared together as at 6. The rotary shear drums are connected by means of a vibrating spindle 7 to a shaft 8 having a gear 9 mounted thereon meshing with pinions 10 and 11 on motor shafts 12 and 13 of the driving motors 14 and 15.

In some of the control systems now in use the rotary shears are mounted in a stationary housing and interconnected with the finishing roll stand from which strip or the like is delivered to the shear so that the relative speeds bear a fixed relation to one another. Provision is made for adjusting this relation so as to correspondingly adjust the length of the cut. This is accomplished by means of a fluid pump and a hydraulically connected fluid motor of the well-known Waterbury type.

Figures 1, 2:
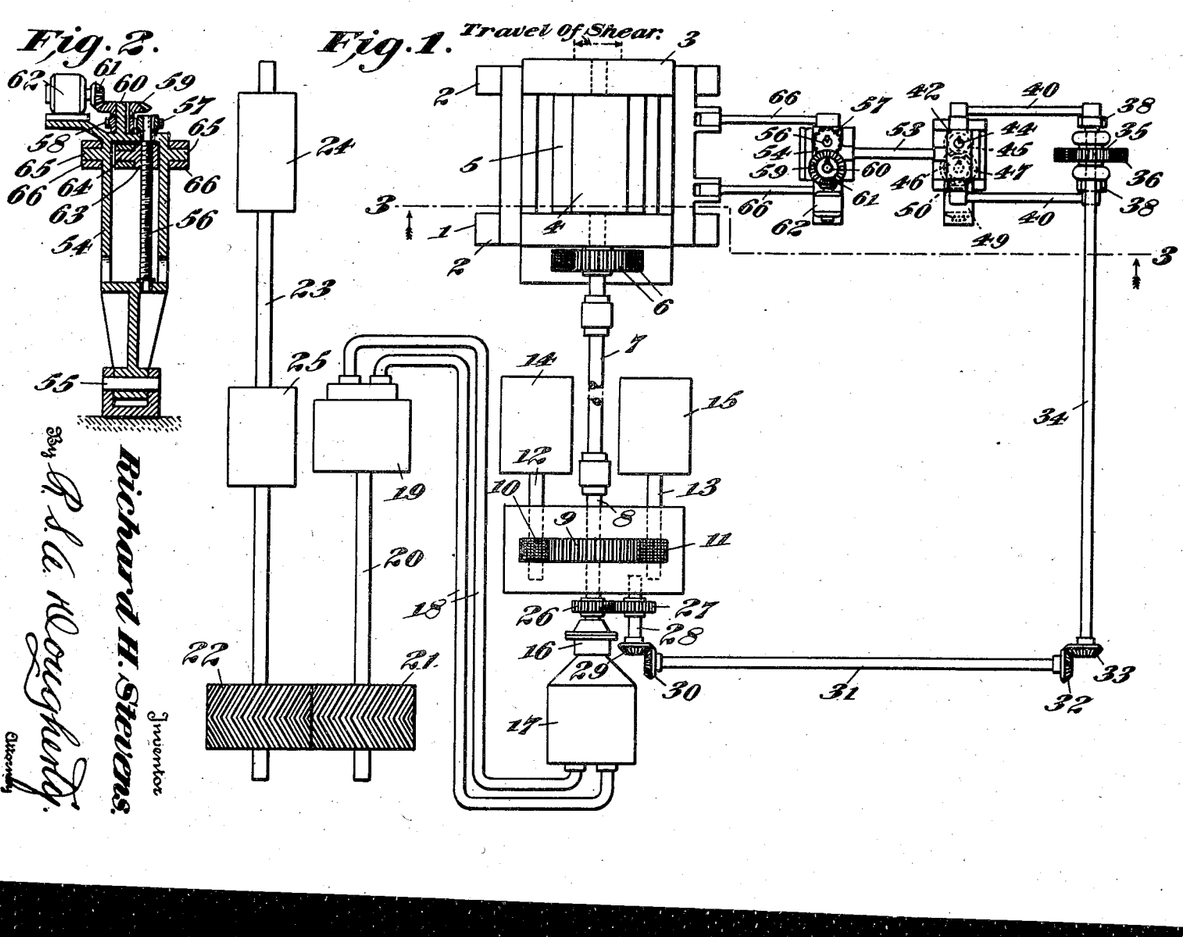
Figure 1 is a plan view showing diagrammatically one form of an oscillating rotary shear constructed in accordance with my invention in which a well known Waterbury control is used.
Fig. 2 is a vertical section of the rocker arm taken on the line 2—2 of Fig. 3.

In this form of my invention the rotating speed is manipulated for shearing varying lengths of strip by a Waterbury hydraulic control and the lever connections for the oscillating movement of shear is arranged to match the speed set by the Waterbury control. To accomplish this the shaft 8 is connected by means of an overrunning clutch 16 to the hydraulic motor 17 which is connected by fluid conductors 18 to a hydraulic pump 19 having a shaft 20 provided with a gear 21 meshing with a gear 22 on shaft 23 extending to the finishing rolls 24 and driven by a motor 25. The hydraulic motor 17 and the pump 19 are of the well-known Waterbury type and run always in a definite speed relationship to one another.

This will be more clearly understood by referring to the Iverson Patent No. 2,085,981, but as this type of control is well known in this art a detailed description of the same is not believed necessary.

In order to control the oscillating movement of the rotating shears the shaft 8 has a spur gear 26 mounted thereon meshing with a similar gear 27 on a stub shaft 28 provided at its outer end with a bevel gear 29 meshing with a bevel gear 30 mounted on one end of a shaft 31, having at its opposite end a bevel gear 32 meshing with a bevel gear 33 on one end of shaft 34 provided at its opposite end portion with a spur gear 35 which meshes with a gear 36 on crank shaft 37 provided with a pair of cranks 38 which are pivoted at one end as at 39 to connecting links 40 that have their opposite ends pivoted to trunnion projections 41 extending from a rocker arm 42 pivoted for swinging movement as at 43. This rocker arm 42 is provided with a threaded shaft 44 having a pinion 45 keyed to its lower end which meshes with a pinion 46 keyed to a bevel gear 47 and mounted on a stub shaft extension 48 at the lower end of the rocker arm.

A motor 49 is mounted on the lower end of the rocker arm 42 having its shaft provided with a bevel gear 50 meshing with the bevel gear 47 for rotating the threaded shaft 44 through the pinions 45 and 46. The threaded shaft 44 is further provided with a nut 51 having a cylindrical extension 52 to which one end of a rod 53 connecting the oscillating arm 54 is pivoted.

Figures 3, 4:
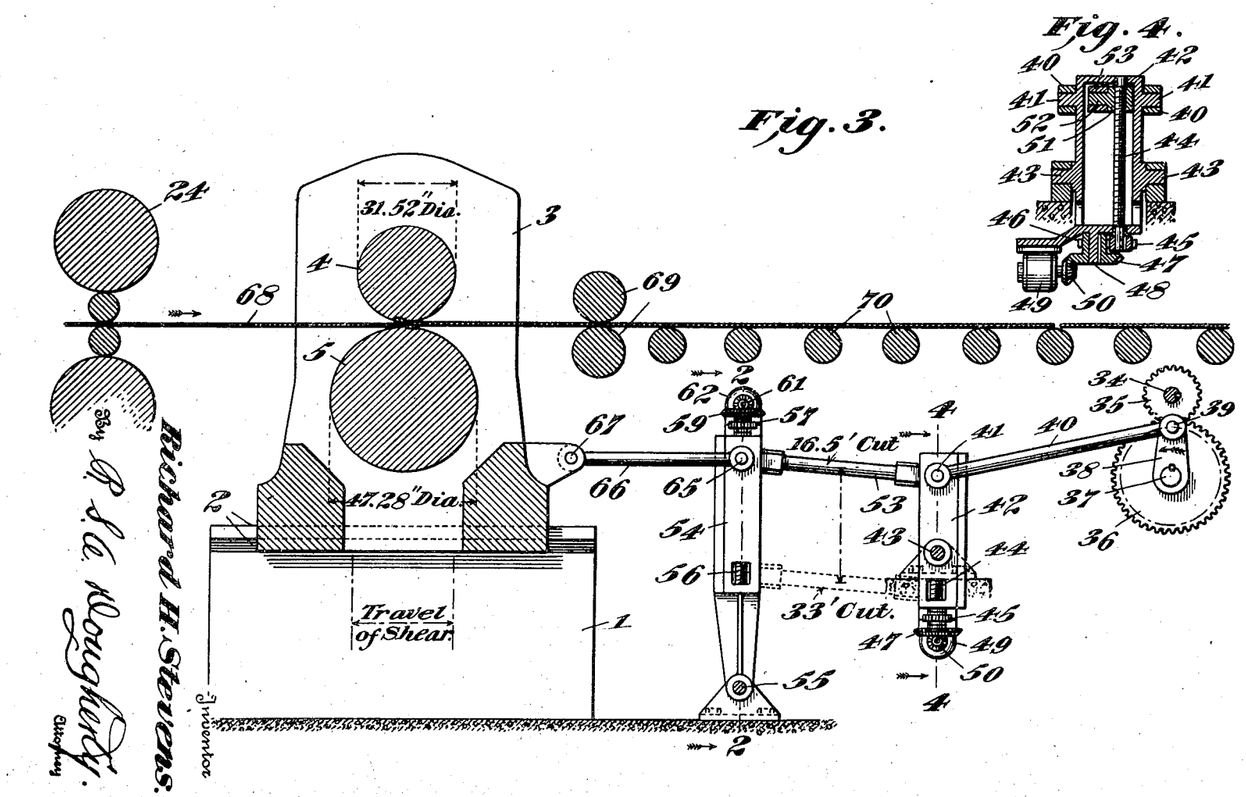
Fig. 3 is a vertical longitudinal section taken on the line 3—3 of Fig. 1 and indicating the approximate relative position of the mechanism at the completion of the cut.
Fig. 4 is a vertical section of the oscillating arm taken on the line 4—4 of Fig. 3.

The oscillating arm 54 is pivoted for swinging movement as at 55 and is constructed in a similar manner to that of the rocker arm 42, except that the gearing and motor are mounted on the top of the arm instead of at the bottom comprising a threaded shaft 56 with a pinion 57 keyed to its upper end meshing with a pinion 58 keyed to a bevel gear 59 mounted on a stub shaft extension 60 of the oscillating arm 54 and rotated by means of a bevel gear 61 on the shaft of a motor 62.

The threaded shaft 56 has a nut 63 thereon with a cylindrical extension 64 to which the opposite end of the rod 53 to that connected to the rocker arm 42 is pivoted and is further provided with oppositely disposed trunnions 65 for pivoting the ends of a pair of pitman rods 66 thereto. The opposite ends of said pitman rods being pivoted to the shear frame 3 as at 67.

In this arrangement the motors 49 and 62 are synchronized with the setting motor for the Waterbury drive and the strip 68 is advanced from the finishing rolls 24 in the direction of the arrow as indicated in Fig. 3 between the shear drums 4 and 5 and after the shearing operation between pinch rolls 69 to a receiving table 70.

When the idea is applied to other rotary shears where the speed is set by hand before starting to cut the levers for giving the oscillating movement of the rotary shears will be set by hand also thus simplifying the lever arrangement. On this type of shear there is a speed change gear which is set by hand for the particular length cut required, and the location of the connecting rod and crank arm are set by hand to the same mark thus giving the proper oscillation of the shears for that cut.

Figures 5, 6, 7, 8:
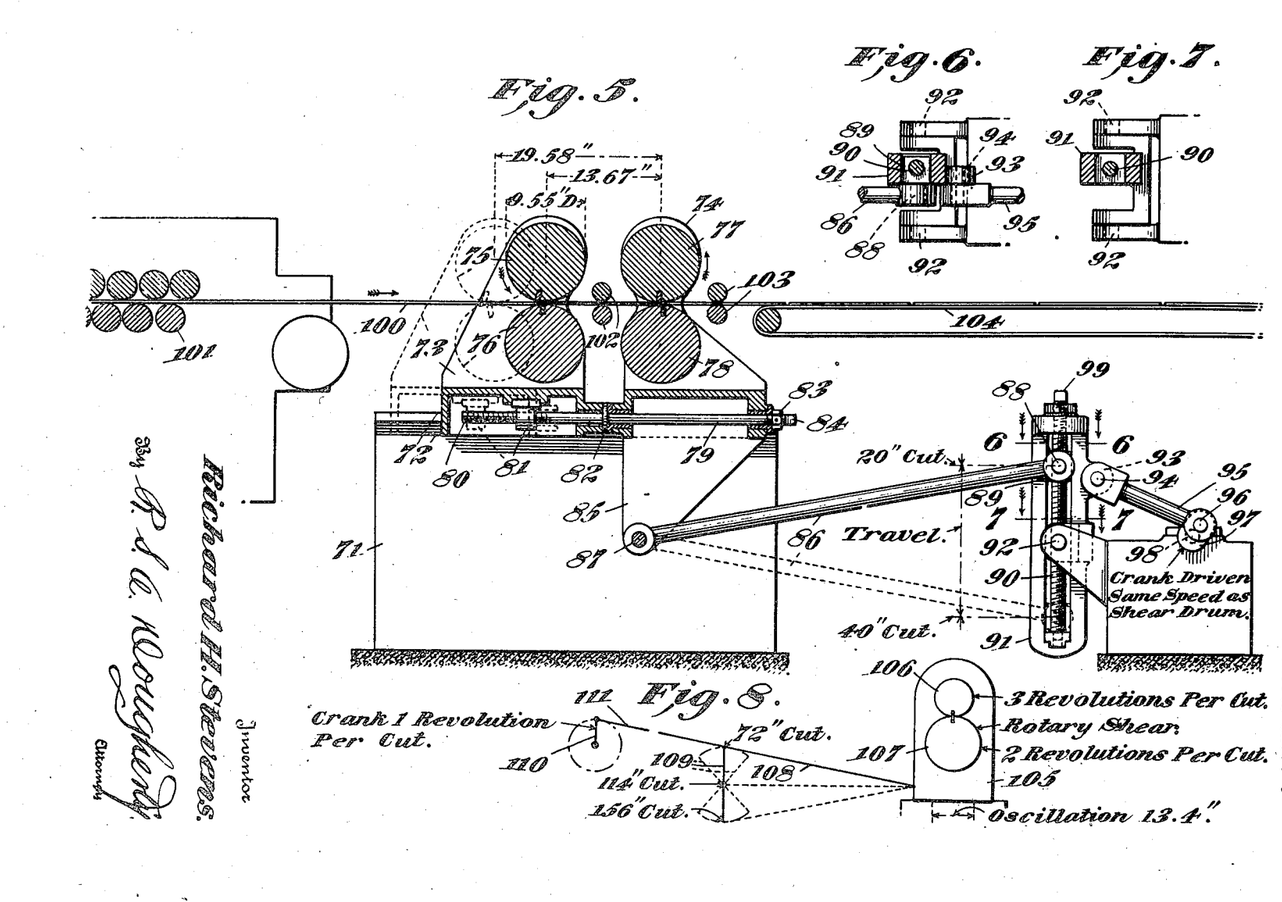
Fig. 5 is a modification showing an oscillating rotary shear having a double head shear.
Fig. 6 is a transverse section of the rocker arm shown in Fig. 5 taken on the line 6—6 of Fig. 5.
Fig. 7 is a transverse section of the rocker arm taken on the line 7—7 of Fig. 5.
Fig. 8 illustrates diagrammatically a synchronized cutting rotary shear with a cutting range from 72" to 156" length cuts.

Referring now to Figs. 5 to 12, inclusive, Fig. 5 shows a double head shear for increased range without increasing the rotary speed, the cutting lengths being as indicated from 14" to 40". With this device both shear heads are used for cutting lengths of strip from 14" to 20" and the adjustable head on the left is omitted when cutting lengths 20" to 40".

If two heads are cutting then the adjustable head is also set at half that distance thus increasing the range of cutting, as indicated in this particular case, from 14" to 40".

In this construction shown in Fig. 5, 71 indicates the base having a slideway 72 for receiving and supporting a pair of shear frames or heads 73 and 74, each provided with a pair of shear drums 75, 76 and 77, 78, respectively, mounted thereon.

The shear frames 73 and 74 are connected together at their bases by means of a rod 79 which is threaded at one end as at 80 to engage a nut 81 secured to the lower surface of the shear frame 73. The rod 79 is provided with a flange 82 and a nut 83 by means of which the rod is clamped in fixed relation to the shear frame 74, and said rod 79 is further provided with a squared end 84 for receiving a wrench or the like for rotating the same for adjusting the shear frame 73, in relation to the shear frame 74. As shown in full lines in this figure the shear frames 73 and 74 are indicated in the position they assume in cutting 14" lengths. When it is desired to cut 20" lengths the shear frame 73 is adjusted by rotating the rod 79 to the position shown in dotted lines, or if it is desired to cut a length between 14" and 20" the shear frame 73 may be adjusted between these two positions. If it is desired to cut lengths between 20" and 40" the shear frame 73 is removed and the adjustment is made on the rocker arm.

For oscillating the shear frames 73 and 74 the shear frame 74 is provided with a downwardly extending flange 85 to which one end of the rod 86 is pivoted as at 87, the opposite end of said rod being pivoted to a stud shaft extension 88 of a nut 89 on a threaded shaft 90 journaled in a rocker arm 91, pivotally mounted as at 92 for swinging movement. The rocker arm 91 has a projecting ear 93 adjacent to its upper end adapted for pivoting as at 94 to one end of a pitman 95, the opposite end of which is pivoted as at 96 to a crank arm 97 having a shaft 98. This crank arm 97 is connected with and is adapted to be driven at the same speed as the shear drums.

The threaded shaft 90 is provided with a squared end 89 for receiving a wrench or the like for rotating the same to adjust the nut 89 and the connecting rod 86.

When two shear frames are used as indicated, the knives on the shear drums of shear frame at the right are disposed 5° ahead of the knives on the shear drums on the shear frame at the left so that each set of knives are cutting while the speed of the strip 100 is under control of the roller leveler 101 preceding the shear. Pairs of pinch rolls 102 and 103 are located adjacent to opposite sides of the shear head 74 operating at strip speed for supporting and advancing the cut lengths of strip to the conveyor 104 and thence to a piler.

Fig. 8 illustrates diagrammatically a synchronous cutting rotary shear for cutting lengths of strip ranging from 72" to 156" in which the shear always cuts when the shear knives and strip are in synchronism. In this diagram 105 indicates the shear frame for the shear drums 106 and 107. A connecting rod 108 is pivoted at one end to the shear frame 105 and its opposite end is adjustably pivoted to a rocker arm 109 in the manner indicated in Fig. 5. The rocker arm 109 is also connected in a similar manner as indicated in this figure to a rotating crank arm 110 by means of a pitman 111.

As an example for this diagram, assuming a normal strip speed of 600' or 7200" per minute and a range of cuts from 72" to 156" being desired, the mean cut at synchronous speed will then be $$\frac{72'' + 156''}{2}$$

or 114".

With two revolutions of the lower shear drum 107 per cut, this drum will be $$\frac{114''}{2}$$

or 57", in circumference or 18.15" in diameter, and the top shear drum 106 will be $$\frac{2}{3} \times 18.15''$$

or 12.1" in diameter.

For the shortest length of cut 72", there will then be $$\frac{7200''}{72}$$

or 100 cuts per minute, at the maximum drum speed of 200 R. P. M. For the longest cut 156", there will be $$\frac{7200''}{156''}$$

or 46.15 cuts per minute, at the maximum drum speed of 92.30 R. P. M. At mean cut 114", there will be $$\frac{7200''}{114''}$$

or 63.15 cuts per minute, the mean rotary synchronous speed of the drum being 126.30 R. P. M.

At 100 cuts per minute the peripheral speed of the drum 107 will be 11,400" per minute, and the differential forward speed will be 11,400"−7200" or +4200".

The peripheral speed of the drum 107, at 46.15 cuts per minute will be 5261" per minute, and the differential backward speed will then be 5261"−7200" or −1939".

If the rotating crank 110 revolves at the rate of one revolution per cut, then at 100 cuts per minute the travel of the crank at each revolution will be $$\frac{4200''}{100}$$

or 42", circumference or 13.4", diameter, giving 6.7", as the radius or length of the crank.

At 46.15 cuts per minute, the crank travel will be $$\frac{1939''}{46.15}$$

or 42", with thus the same crank radius.

Figure 9:
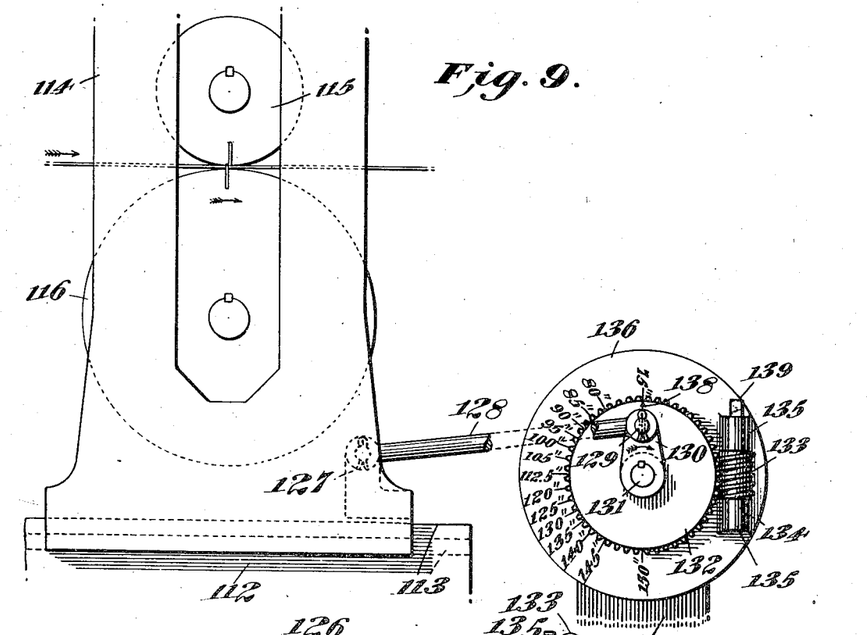
Fig. 9 is a modification in which the crank arm and speed change gear are located adjacent to the shear frame with an adjustable rod connecting the crank arm to the shear frame.
Figure 10:
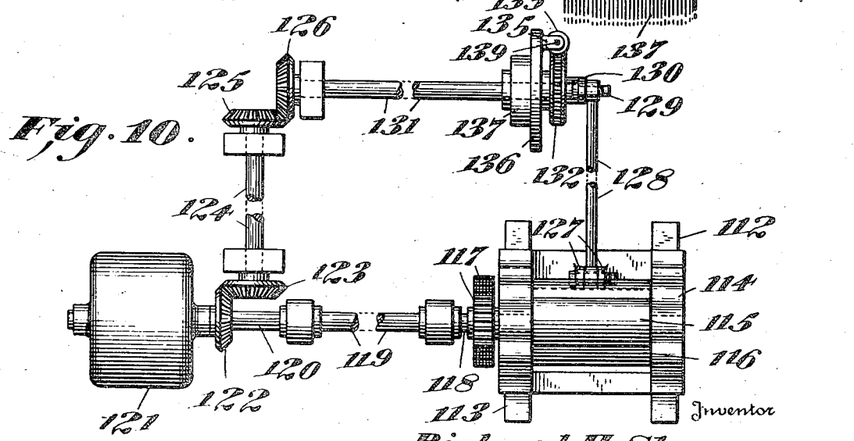
Fig. 10 is a top plan view of the modification shown in Fig. 9.

Figs. 9 and 10 illustrate another modification in which the crank and speed change gear are located adjacent to the shear frame with a rod connecting the crank arm with the shear frame, in which 112 indicates the base having a slideway 113 for the shear frame or head 114 for supporting the shear drums 115 and 116 geared together as at 117.

The shaft for the lower shear drum 116 at one end extends outwardly as at 118 and is coupled to one end of a vibrating spindle 119, the opposite end of said vibrating spindle being coupled to the shaft 120 of a motor 121 for rotating the shear drums.

The motor shaft 120 has a bevel gear 122 keyed thereto meshing with a bevel gear 123 on a shaft 124 which has a gear 125 thereon meshing with a gear 126 on the crank shaft 131. The base of the shear frame 114 is provided centrally with a pair of upwardly extending ears 127 to which is pivoted one end of a rod 128 having its opposite end pivoted as at 129 to a crank arm 130 which is mounted on one end of the shaft 131 and keyed to a worm wheel 132 meshing with a worm 133 having its shaft 134 journaled in bearings 135 extending from a disk 136 mounted on the crank shaft 131 which is journaled in a fixed pedestal support 137 and provided with a scale thereon ranging from 75" to 150". The worm wheel has a pointer 138 thereon indicated as set for 75" cuts. When it is desired to cut lengths ranging from 75" up to 150" a wrench or the like is applied to the squared end 139 of the shaft 134 and the worm 133 rotated thereby rotating the worm wheel 132 until the pointer 138 is moved to the desired length cut indicated on the scale.

The worm wheel 132 is driven from the shear drive and at the same speed and is mounted on the crank drive and changes the relative position of the crank and knives so the cutting will be done when the crank is in a position to give the correct speed.

Figure 11:
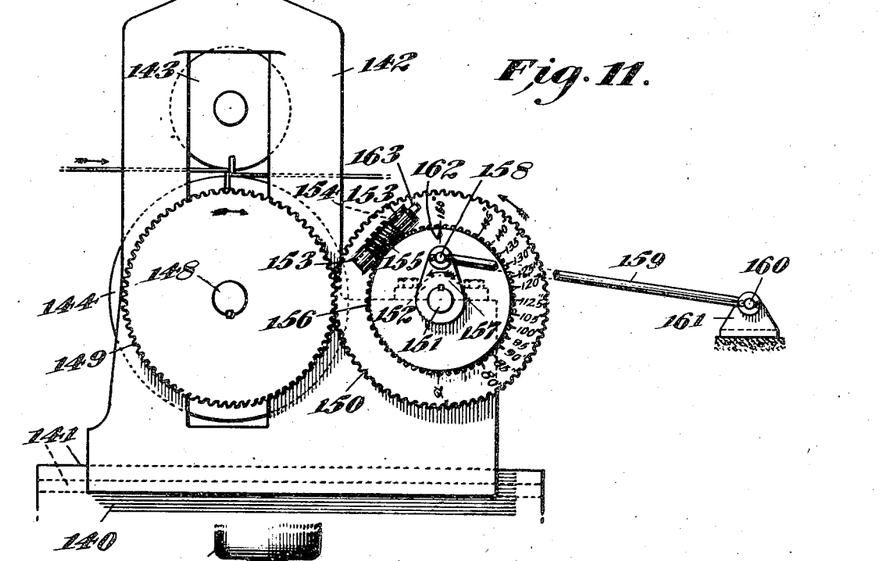
Fig. 11 shows another modification in which the speed change gear is mounted directly on the oscillating shear frame and driven by the shear drive.
Figure 12:
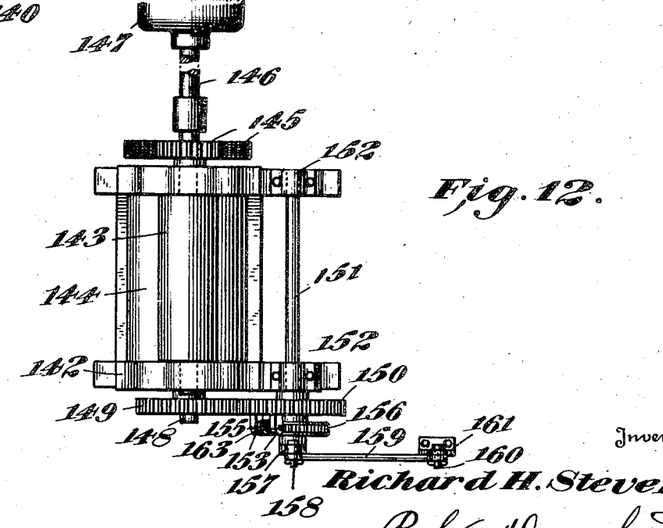
Fig. 12 is a top plan view of the detail shown in Fig. 11.

In Figs. 11 and 12 I have shown another modification in which the worm is mounted on a gear driven by a gear on the lower drum shaft and adapted to oscillate with the shear frame or head as a unit. In these figures 140 indicates the base having a slideway 141 for the shear frame 142 with top and bottom drums 143 and 144 geared together as at 145 and the lower drum 144 is connected by means of a vibrating spindle 146 to the driving motor 147 at one side of the shear. On the other side of the shear the end of the shaft for the lower shear drum extends outwardly as at 148 and has a gear 149 keyed thereto which meshes with a gear 150 of the same size or radius provided with a scale with a cutting range from 75" to 150" and mounted for adjustment on a shaft 151 which is journaled in bearings 152 on the shear frame 142. The gear 150 has a pair of extending bearings 153 formed integral therewith in which is journaled the shaft 154 of a worm 155 meshing with a worm wheel 156 mounted on the shaft 151 and keyed to a crank arm 157. The crank arm 157 is pivoted as at 158 to one end of a connecting rod 159, said rod having its opposite end pivoted as at 160 to an anchor bracket 161. The worm gear is provided with a pointer 162. The relation of the crank arm 157 to the shear knives as shown in Fig. 11 is for making 150" cuts. By applying a wrench to the extending squared end 163 of the worm shaft 154 the position can be shifted with the worm 155 to intermediate points as indicated for cuts desired.

Figure 13:
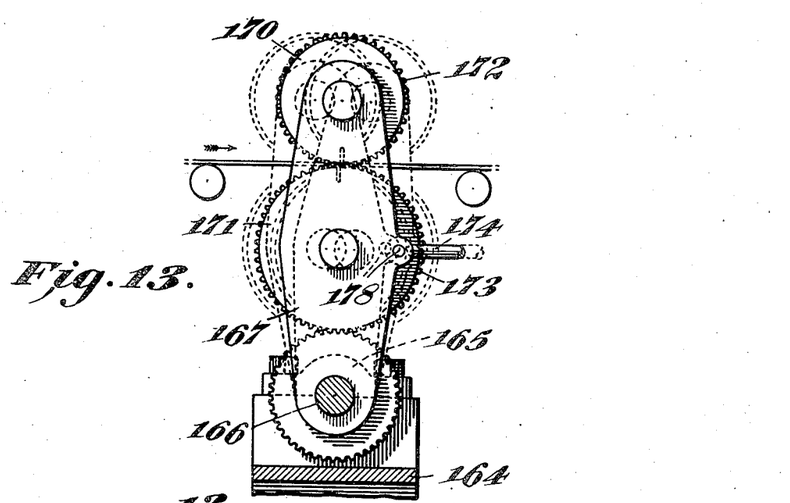
Fig. 13 shows another modification in which the oscillating rotary shears are mounted and supported on swinging arms.
Figure 14:
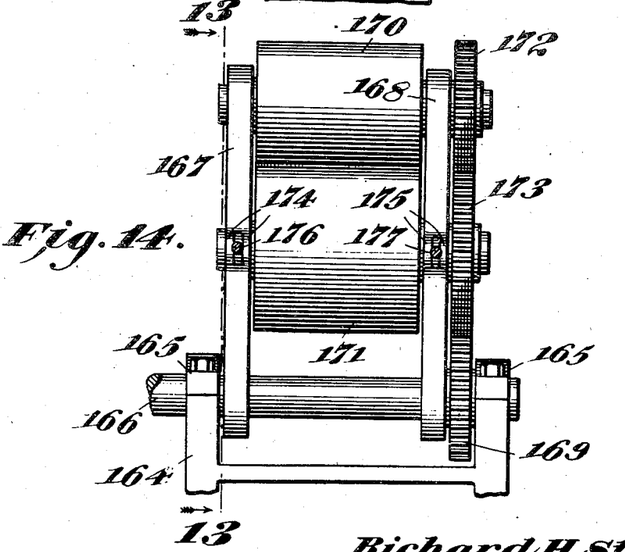
Fig. 14 is a front elevation of the detail shown in Fig. 13.

In Figs. 13 and 14, I have illustrated an oscillating rotary shear having the shafts of the rotating drums journaled in swinging arms instead of a reciprocating shear frame in which 164 indicates the base frame provided with bearings 165 for a drive shaft 166 which extends through the lower ends of spaced swinging side arms 167 and 168 having a gear 169 mounted thereon for rotating the top and bottom shear drums 170 and 171 through the gear 172 and 173, respectively. The pivoted swinging side arms 167 and 168 are provided centrally with ears 174 and 175 to which the ends of a pair of rods 176 and 177 are pivoted as at 178. The connecting rods are adapted to extend to controlling means and assuming the strip speed is 600 feet per minute and the cutting range 72" to 156" the description of Fig. 8 would apply in a similar manner to this modification.

Although I have shown and described my invention in considerable detail, I do not wish to be limited to the exact construction shown and described, but may use such substitutions, modifications or equivalents thereof, as are embraced within the scope of my invention, or as pointed out in the claims.

Having thus described my invention, what I claim as new and desire to secure by Letters Patent is:

1. In a rotary shear adapted to cut moving strip material into lengths, a pair of cooperating shear drums mounted for reciprocation with the strip material each having a cutting blade thereon, means for rotating the shear drums, a rotary crank arm, a connection between the rotating crank arm and the shear drums, and means for adjusting the connection for varying the speed of the reciprocating and rotating shear drums for various length cuts.

2. In a rotary shear adapted to cut moving strip material into lengths, a pair of cooperating shear drums mounted for reciprocation with the strip material each having a cutting blade thereon, means for rotating the shear drums, a crank arm mounted adjacent to the shear drums, means for rotating the crank arm, a connection between the rotating crank arm and the drive for the rotating shear drums, a pivoted arm in the connection between the rotating crank arm and the means for rotating the shear drums, and adjusting means on the pivoted arm for varying the reciprocating speed of the rotating shear drums for various length cuts.

3. In a rotary shear adapted for cutting continuously moving strip material into lengths, upper and lower cooperating shear drums mounted for reciprocation with the strip material each having a cutting blade thereon, means for rotating the shear drums, a rotating crank arm, means for continuously rotating the crank arm, and an adjustable connection between the crank arm and the drive for the rotating shear drums for varying and synchronizing the speeds of reciprocation of the rotating shear drums with the strip material for various length cuts.

4. A rotary oscillating shear adapted to cut moving strip material into lengths, comprising a reciprocating shear frame, a pair of cooperating rotary shear drums each having a cutting blade thereon mounted in the shear frame, means for rotating the shear drums, a rotating crank arm for reciprocating the shear frame, an adjustable connection between the rotating crank arm and the shear frame, and means for rotating the crank arm the same speed as the shear drums.

5. A rotary oscillating shear adapted to cut moving strip material into lengths, comprising a reciprocating shear frame, a pair of cooperating rotary shear drums each having a cutting blade thereon mounted in the shear frame, means for rotating the shear drums, a crank arm rotated through the drive for the shear drums, a connection between the crank arm and the reciprocating shear frame, and means in the connection adapted to rotate the crank arm the same speed as the shear drums during the reciprocation of the shear frame.

6. A rotary oscillating shear adapted to cut moving strip material into lengths, comprising a reciprocating shear frame, a pair of cooperating rotary shear drums each having a cutting blade thereon mounted in the shear frame, means for rotating the shear drums, a crank arm mounted adjacent to the shear frame and rotated by the drive for the shear drums for reciprocating the shear frame, and an adjustable connection between the crank arm and the shear frame for varying the speed of the reciprocating shear frame and the rotary shear drums to synchronize their speed with the speed of the strip for various length cuts.

7. A rotary oscillating shear adapted to cut moving strip material into lengths, comprising a reciprocating shear frame, a pair of cooperating rotary shear drums having cutting blades thereon mounted in the shear frame, a crank arm mounted adjacent to the shear frame rotated through the drive for the shear drums, a swinging rocker arm having a link connection with the crank arm, an oscillating arm mounted for swinging movement, a pitman connection between shear frame and the oscillating arm, a connecting rod between the rocker arm and the oscillating arm, and means for adjusting the connecting rod for adjusting the reciprocating shear frame and the rotary shear drums to synchronize their speed with the strip material for various length cuts.

8. A rotary oscillating shear adapted to reciprocate relative to a moving strip material to shear the material into lengths, comprising a reciprocating shear frame, a pair of cooperating rotary shear drums each having a cutting blade thereon mounted in the shear frame, driving means for rotating the shear drums, a crank arm mounted adjacent to the shear frame rotated through the drive for the rotary shear drums for reciprocating the shear frame, a connection between the crank arm and the shear frame, and adjusting means in the connection for varying the speed of the reciprocating shear frame to synchronize the speed with the strip material with the rotary shear drums for various length cuts.

9. A rotary oscillating shear adapted to cut moving strip material into lengths, comprising a reciprocating shear frame, a pair of cooperating rotary shear drums each having a cutting blade thereon mounted in the shear frame, a crank arm mounted adjacent to the shear frame rotated through the drive for the shear drums, a swinging rocker arm having pivoted link connections between the crank arm and the reciprocating shear frame, and means for adjusting the pivoted link connections on the swinging rocker arm for varying the speed of the reciprocating shear frame and the rotary shear drums to synchronize the speed with the strip material for various length cuts.

10. A rotary oscillating shear adapted to cut moving strip material into lengths, comprising, a reciprocating shear frame, a pair of cooperating rotary shear drums each having a cutting blade thereon mounted in the shear frame, a crank arm mounted adjacent to the shear frame rotated through the drive for the shear drums, a swinging rocker arm between the shear frame and the crank arm, a pivoted link connection between the crank arm and the swinging rocker arm, a threaded shaft journaled in the swinging rocker arm, a nut on the threaded shaft, a rod having one end pivoted to the nut and its opposite end with a connection pivoted to the shear frame, and means for rotating the threaded shaft journaled in the swinging arm for adjusting the nut for varying the speed of the reciprocating shear frame and the rotating shear drums to synchronize the speed with the strip material for various length cuts.

11. A rotary oscillating shear adapted to cut moving strip material into lengths, comprising a reciprocating shear frame, a pair of cooperating rotary shear drums each having a cutting blade thereon mounted in the shear frame, a crank arm mounted adjacent to the shear frame rotated through the drive for the shear drums, a pair of arms mounted for swinging movement and in spaced relation between the crank arm and the reciprocating shear frame, a link connecting one of the swinging arms with the crank arm, a pitman connecting the other swinging arm with the shear frame, a connecting rod between the swinging arms, and means for adjusting the connecting rod between the swinging arms to vary the speed of the reciprocating shear frame and the rotary drums to synchronize their speed with the strip material for various length cuts during the cutting operation.

12. A rotary oscillating shear adapted to cut moving strip material into lengths, comprising a reciprocating shear frame, a pair of cooperating rotary shear drums each having a cutting blade thereon mounted in the shear frame, crank arms mounted adjacent to the shear frame rotated through the drive for the shear drums, a rocker arm mounted for swinging movement having trunnion extensions, link connections having their ends pivotally attached to the trunnion extensions and the crank arms, a screw threaded shaft journaled in the rocker arm, a nut on the screw threaded shaft, an oscillating arm mounted for swinging movement between the rocker arm and the shear frame having trunnion extensions, pitmans having their ends pivotally attached to the trunnion extensions of the oscillating arm, and the shear frame, a screw threaded shaft journaled in the oscillating arm, a nut on said screw threaded shaft, a rod connecting the rocker arm and oscillating arm having its ends pivoted to the nuts on the screw threaded shafts, and means for rotating the screw threaded shafts to adjust the nuts and rod connection to vary the speed of the reciprocating shear frame and the rotary shear drums to synchronize their speed with the strip material for various length cuts during the cutting operation.

13. A rotary oscillating shear adapted to cut moving strip material into lengths, comprising a reciprocating shear frame, a pair of cooperating rotary shear drums each having a cutting blade thereon mounted in the shear frame, a crank arm mounted adjacent to the shear frame rotated through the drive for the shear drums, a connection between the crank arm and the shear frame, and means for adjusting the connection between the crank arm and the shear frame to vary the speed of the reciprocating shear frame and the rotating shear drums to synchronize their speed with the strip material for various length cuts during the cutting operation.

14. A rotary oscillating shear adapted to cut moving strip material into lengths, comprising a reciprocating shear frame, a pair of cooperating rotary shear drums each having a cutting blade thereon mounted in the shear frame, a crank arm mounted adjacent to the shear frame rotated through the drive for the shear drums, a rocker arm mounted for swinging movement, a link connection between the rocker arm and the crank arm having its ends pivotally attached thereto, an oscillating arm mounted for swinging movement, a pitman connecting the oscillating arm with the reciprocating shear frame having its ends pivotally attached thereto, a connecting rod having its ends pivotally attached to the oscillating and rocker arms, and means for adjusting the connecting rod between the oscillating and rocker arms to vary the speed of the reciprocting shear frame and the rotary shear drums to synchronize their speed with the strip material for various length cuts during the cutting operation.

15. A rotary oscillating shear adapted to cut moving strip material into lengths, comprising a reciprocating shear frame, a pair of cooperating rotary shear drums each having a cutting blade thereon mounted on the shear frame, a crank arm mounted adjacent to the shear frame rotated through the drive for the shear drums, a rocker arm mounted for swinging movement having a pivoted link connection to the crank arm, a screw threaded shaft journaled in the rocker arm, a nut on the screw threaded shaft, an adjustable connection between the nut and the shear frame and pivotally attached thereto, and means for rotating the screw threaded shaft to adjust the nut and connection to the shear frame for varying the speed of the reciprocating shear frame and the rotary shear drums to synchronize their speed with the strip material for various length cuts during the cutting operation.

16. A rotary oscillating shear adapted to cut moving strip material into lengths, comprising a reciprocating shear frame, a pair of cooperating rotary shear drums each having a cutting blade thereon mounted in the shear frame, crank arms mounted adjacent to the shear frame rotated through the drive for the shear drums, a rocker arm mounted for swinging movement having trunnion extensions, link connections having their ends pivotally attached to the trunnion extensions and the crank arms, a screw threaded shaft journaled in the rocker arm, a nut on the screw threaded shaft, an oscillating arm mounted for swinging movement between the rocker arm and the shear frame having trunnion extensions, pitmans having their ends pivotally attached to the trunnion extensions of the oscillating arm and the shear frame, a screw threaded shaft journaled in the oscillating arm, a nut on said screw threaded shaft, a rod connecting the rocker arm and the oscillating arm having its ends pivoted to the nuts on the screw threaded shafts, and electrically operated means for rotating the screw threaded shafts simultaneously to adjust the nuts and rod connection to vary the speed of the reciprocating shear frame and the rotary shear drums to synchronize their speed with the strip material for various length cuts during the cutting operation.

17. A rotary oscillating shear adapted to cut moving strip material into lengths, comprising a pair of reciprocating shear frames, a pair of cooperating rotary shear drums mounted in each reciprocating shear frame, a cutting blade on each shear drum, a crank arm mounted adjacent to the shear frames adapted to be driven the same speed as the shear drums to reciprocate the shear frames, a rocker arm mounted for swinging movement between the crank arm and the reciprocating shear frame, a pitman having its ends pivoted to the crank arm and the rocker arm, a screw threaded shaft journaled in the rocker arm, a nut on the screw threaded shaft, a connecting rod having one end pivoted to the nut and the opposite end pivotally connected to one of the reciprocating shear frames, and means for rotating the screw threaded shaft to adjust the nut and end of the connecting rod for varying the speed of the reciprocating shear frame and the knife speeds for the rotary shear drums to synchronize the speed of the shear drums with the speed of the strip for various length cuts.

18. A rotary oscillating shear adapted to cut moving strip material into lengths, comprising a pair of coacting reciprocating shear frames, means for adjusting the shear frames in spaced relation to each other, a pair of cooperating rotary shear drums mounted in each reciprocating shear frame, a cutting blade on each shear drum, the cutting blades in one pair of shear drums adapted to be mounted in one shear frame approximately 5° ahead of the shear blades in the shear drums in the adjacent shear frame, a crank arm mounted adjacent to the shear frames adapted to be driven the same speed as the shear drums to reciprocate the shear frames, a rocker arm mounted for swinging movement between the crank arm and the reciprocating shear frame, a pitman having its ends pivoted to the crank arm and rocker arm, a screw threaded shaft journaled in the rocker arm, a nut on the screw threaded shaft, a connecting rod having one end pivoted to the nut and the opposite end pivotally connected to one of the reciprocating shear frames, and means for rotating the screw threaded shaft to adjust the nut and end of the connecting rod for varying the speed of the reciprocating shear frame and the knife speeds for the rotary shear drums to synchronize the speed of the shear drums with the speed of the strip for various length cuts.

19. A rotary oscillating shear adapted to cut moving strip material into lengths, comprising a reciprocating shear frame, a pair of cooperating rotary shear drums each having a cutting blade thereon mounted in the shear frame, means for rotating the shear drums, a crank arm mounted on the shear frame and movable therewith, means driven by one of the shear drums for rotating the crank arm, a rod having one end pivoted to a fixed anchor and the opposite end pivoted to the rotating crank arm, and means for adjusting the relation of the crank arm to the shear blades to synchronize the speed of the reciprocating shear frame and the shear drums with the speed of the strip for various length cuts.

20. A rotary oscillating shear adapted to cut moving strip material into lengths, comprising a reciprocating shear frame, a pair of cooperating rotary shear drums, each having a cutting blade thereon mounted in the shear frame, means for rotating the shear drums, a gear keyed to the end of the shaft of one of shear drums, a crank shaft journaled in bearings on the shear frame, a gear of the same diameter as that on the drum shaft secured to the crank shaft and meshing with and driven by the gear on the drum shaft, a worm wheel on the crank shaft adapted to rotate on the crank shaft, a crank keyed to the worm wheel, bearings extending from the gear on the crank shaft, a worm meshing with the worm wheel having its shaft journaled in the bearings, a rod having one end pivoted to a fixed anchor and the opposite end pivoted to the rotating crank arm, a scale on the gear on the crank shaft for indicating the cut desired, and means for rotating the worm to rotate the worm wheel and crank in relation to the gear on the crank shaft.

21. A rotary oscillating shear adapted to cut moving strip material into lengths, comprising a reciprocating shear frame, a pair of cooperating rotary shear drums each having a cutting blade thereon mounted in the shear frame, means for rotating the shear drums, a crank arm mounted for rotation adjacent to the shear drums, means for rotating the crank arm through the drive for the shear drums to reciprocate the shear frame, and means for adjusting the angularity of the crank arm in relation to the cutting blades for different length cuts.

22. A rotary oscillating shear adapted to cut moving strip material into lengths, comprising a reciprocating shear frame, upper and lower cooperating rotary shear drums each having a cutting blade thereon mounted in the shear frame, means for rotating the shear drums, a crank shaft journaled in bearings on the shear frame, a crank arm mounted on the crank shaft, a rod having one end pivoted to a fixed anchor and the opposite end pivoted to the crank arm, means for rotating the crank arm the same number of revolutions as the lower shear drum, and means for adjusting the angularity of the crank arm in relation to the shear blades for various length cuts.

23. A rotary oscillating shear adapted to cut moving strip material into lengths, comprising a reciprocating shear frame, upper and lower cooperating rotary shear drums each having a cutting blade thereon mounted in the shear frame, means for rotating the shear drums, a crank shaft journaled in bearings on the shear frame, a crank arm mounted on the crank shaft, a gear secured to the lower shear drum meshing with a gear of the same diameter keyed to the crank shaft, a scale on the gear keyed to the crank shaft, a worm wheel provided with a pointer mounted for rotation with the crank arm on the crank shaft, a rod having one end pivoted to a fixed anchor and the opposite end pivoted to the crank arm, and means for adjusting the crank arm and worm wheel so the pointer will register with the scale on the gear wheel mounted on the crank shaft for the length of cut desired.

24. A rotary oscillating shear adapted to cut moving strip material into lengths, comprising a reciprocating shear frame, upper and lower cooperating rotary shear drums each having a cutting blade thereon mounted in the shear frame, means for rotating the shear drums, a crank shaft journaled in bearings on the shear frame, a crank arm mounted on the crank shaft, a gear secured to the lower shear drum meshing with a gear of the same diameter keyed to the crank shaft, a scale on the gear keyed to the crank shaft, a worm wheel provided with a pointer mounted for rotation with the crank arm on the crank shaft, a rod having one end pivoted to a fixed anchor and the opposite end pivoted to the crank arm, journal bearings extending from the side of the gear mounted on the crank shaft, a worm meshing with the worm wheel having its shaft journaled in the bearings extending from the side of the gear mounted on the crank shaft, and means for rotating the worm for adjusting the crank arm and worm wheel so the pointer will register with the scale on the gear wheel mounted on the crank shaft for the length of cut desired.

RICHARD H. STEVENS.